(12) United States Patent  (10) Patent No.: US 9,018,943 B2
Schrubbe  (45) Date of Patent: Apr. 28, 2015

(54) MAGNETICALLY COUPLED ROTARY MAGNETIC ENCODER WITH ANGLE ERROR REDUCTION

(75) Inventor: Carl D. Schrubbe, Waukesha, WI (US)

(73) Assignee: Joral LLC, New Berlin, WI (US)

( * ) Notice: Subject to any disclaimer, the term of this patent is extended or adjusted under 35 U.S.C. 154(b) by 552 days.

(21) Appl. No.: 13/332,358

(22) Filed: Dec. 20, 2011

(65) Prior Publication Data

US 2012/0153940 A1  Jun. 21, 2012

Related U.S. Application Data

(60) Provisional application No. 61/425,030, filed on Dec. 20, 2010.

(51) Int. Cl.
*G01B 7/30* (2006.01)
*G01D 5/14* (2006.01)
*G01D 11/02* (2006.01)

(52) U.S. Cl.
CPC *G01B 7/30* (2013.01); *G01D 5/145* (2013.01); *G01D 11/02* (2013.01)

(58) Field of Classification Search
None
See application file for complete search history.

(56) References Cited

U.S. PATENT DOCUMENTS

| 2,804,515 | A | 8/1957 | Heggen |
| 4,275,291 | A | 6/1981 | Feller |
| 5,365,785 | A | 11/1994 | Martin |
| 5,382,792 | A | 1/1995 | Hurst et al. |
| 5,856,743 | A | 1/1999 | Juniman |
| 6,154,975 | A | 12/2000 | Steinich |
| 6,326,781 | B1 | 12/2001 | Kunde et al. |
| 7,855,552 | B2 * | 12/2010 | Steinich .................. 324/207.25 |
| 8,294,457 | B2 * | 10/2012 | Schrubbe et al. ........ 324/207.25 |
| 2007/0151322 | A1 | 7/2007 | Steinich |
| 2009/0072816 | A1 | 3/2009 | Schrubbe et al. |
| 2010/0186246 | A1 | 7/2010 | Steinich et al. |
| 2010/0213927 | A1 | 8/2010 | Mehnert et al. |
| 2011/0187351 | A1 | 8/2011 | Hunger |

FOREIGN PATENT DOCUMENTS

WO   WO 2009033127 A2 *  3/2009

* cited by examiner

*Primary Examiner* — Paresh Patel
(74) *Attorney, Agent, or Firm* — Boyle Fredrickson S.C.

(57) ABSTRACT

A rotary magnetic encoder assembly of noncontact or "contactless" construction having an internally disposed first exciter or sensor magnet magnetically coupled to an externally disposed second application or drive magnet attached to an encoder shaft that rotates the sensor magnet substantially in unison therewith during encoder shaft rotation. The sensor magnet is rotatively supported by a friction reducer that is a bearing arrangement that provides point bearing contact preventing stiction and reducing dynamic friction of the sensor magnet minimizing angle error and helping to prevent "Quiver." In one embodiment, the friction reducer is a spherical ball bearing. In another embodiment, the friction reducer is a thrust bearing that includes a spindle carrying the sensor magnet. A magnetic anchor can be disposed between the sensor magnet and drive magnet to help keep the sensor magnet in point bearing contact during rotation further minimizing angle error.

37 Claims, 8 Drawing Sheets

MAGNETICALLY COUPLED ROTARY MAGNETIC ENCODER WITH ANGLE ERROR REDUCTION

CROSS REFERENCE

This application claims the benefit under 35 U.S.C. §119 (e) of U.S. Provisional Patent Application Ser. No. 61/425,030 filed on Dec. 20, 2010, the entirety of which is hereby expressly incorporated herein.

FIELD

The present invention relates generally to rotary magnetic encoders and more particularly to a rotary magnetic encoder employing a sensor magnet driven by a drive magnet attached to a rotary encoder shaft having improved tracking accuracy.

BACKGROUND

In the past, rotary magnetic encoders employed an external application magnet attached to an end of a rotary encoder shaft rotatively supported by one or more shaft bearings that were required to align the rotating shaft to accurately locate the magnet relative to Hall sensors of a magnetic field sensor of an onboard rotary magnetic encoder chip. Shaft bearings were required to maintain precise shaft alignment to locate the external magnet relative to the Hall sensors because the Hall sensors require a uniform magnetic field distribution to be provided by the magnet. Failure to provide a desirably uniform magnetic field distribution, such as what can happen if shaft misalignment due to bearing wear occurs, can cause undesirably high signal noise, positional error, or both.

Commonly owned U.S. application Ser. No. 12/205,902 discloses a shaft misalignment tolerant rotary magnetic encoder having an internal magnet received in a pocket formed in the body of a low magnetic permeability encoder housing located adjacent the rotary magnetic encoder chip that is rotatively driven by an external drive magnet mounted to the encoder shaft. During operation, rotation of the encoder shaft rotates the external drive magnet substantially in unison therewith magnetically coupling the external magnet to the internal magnet within the encoder housing causing the internal magnet to rotate substantially in unison with the external drive magnet. As a result of being located in close proximity to the Hall sensors of the encoder chip, the internal magnet provides a desirably uniform magnetic field distribution even when shaft misalignment occurs. Such a rotary magnetic encoder of shaft misalignment tolerant construction can be of more economical construction as it does not require shaft bearings adjacent the encoder housing to rotatively support and align the encoder shaft.

While noncontact or "contactless" shaft misalignment tolerant rotary magnetic encoders have enjoyed considerable commercial success, improvements nonetheless remain desirable. For example, as the internal magnet spins within encoder housing, it can come into contact with part of the housing causing the angular velocity of the internal magnet to non-uniformly vary, which can cause an undesirable magnitude of angle error and a hysteresis phenomenon known as "Quiver." During encoder operation, the rotating internal magnet, particularly when rotating at relatively high speeds can levitate or lift causing it to "float" within the encoder housing inducing drag on the internal magnet which can also cause an undesirable magnitude of angle error.

What is needed is a shaft misalignment tolerant rotary magnetic encoder of improved construction that minimizes angle error during encoder operation.

SUMMARY

The present invention is directed to a rotary magnetic encoder assembly employing a friction reducer to rotatively support an internally disposed first exciter or sensor magnet that is magnetically coupled to an externally disposed second application or drive magnet that is fixed to a rotary encoder shaft that rotates during operation causing the sensor magnet to rotate substantially simultaneously therewith. The friction reducer is a bearing arrangement that provides a reduced contact surface area with the sensor magnet preventing stiction and reducing variations in sensor magnet angular velocity reducing angle error. Magnetic coupling is enhanced and can be increased by a magnetic anchor disposed between the sensor magnet and the drive magnet that pulls the rotating sensor magnet towards the drive magnet maintaining friction reducing contact between the sensor magnet and the friction reducer during encoder operation.

In one embodiment, the friction reducer is an internally disposed round ball that provides a spherical bearing disposed between the sensor magnet and the drive magnet that provides point contact between the sensor magnet and the spherical bearing during sensor magnet rotation. In a preferred embodiment, the spherical bearing is internally disposed within a sensor magnet retaining pocket formed in a body or housing of the encoder assembly. To help maintain location of the spherical bearing within the pocket, the pocket includes a recess of conical shape in which the spherical bearing seats.

In another embodiment, the friction reducer is a thrust bearing formed of a spindle bearing arrangement received in a bore formed in an end wall of the encoder body or housing. The spindle bearing arrangement includes a bearing basket in which a needle of a spindle carrying the sensor magnet is received and axially and radially rotatively supported. The bearing basket includes a bearing assembly received within the basket having an end wall bearing providing axial or thrust bearing support and at least one bearing ring spaced from the end wall bearing providing radial bearing support.

The end wall bearing provides a bearing surface against which a free end of the needle of the spindle axially rotatively bears. In one embodiment, the at least one bearing ring has a convexly arcuate inner bearing surface against which a portion of the spindle needle is radially rotatively supported. In a preferred embodiment, the bearing assembly includes a plurality of axially spaced apart bearing rings each having a radially inwardly extending convexly curved arcuate inner bearing surface providing radial bearing support to the spindle needle at a plurality of axially spaced apart locations along the spindle needle.

The spindle has an head from which the needle outwardly extends. The head is received in a sensor magnet of tubular construction such that the sensor magnet is mounted to the head. In a preferred embodiment, the sensor magnet is a tube magnet having a bore in which the spindle head is received. The spindle head is fixed to the tubular sensor magnet such that the spindle rotates substantially in unison with the sensor magnet during operation.

The magnetic anchor is disposed between the sensor magnet and the drive magnet and is made of a magnetic material that can be ferromagnetic. In one embodiment, the magnetic anchor is carried by the encoder body or housing and can be made of a magnetic material having a magnetic permeability less than the sensor and drive magnets. In one preferred embodiment, the magnetic anchor is formed of a washer or annular wire seated in a groove or channel formed in an end wall of the encoder body or housing.

During operation, magnetic attraction between the sensor magnet and magnetic anchor pulls the rotating sensor magnet toward the friction reducer maintaining reduced friction contact therebetween. As a result, variations in angular velocity of the rotating sensor magnet are minimized and preferably substantially completely prevented minimizing angle error and "Quiver." As a result of the point contact provided by the friction reducer, stiction of the sensor magnet, particularly during spin up when the encoder shaft starts to rotate, is preferably substantially completely prevented. In addition, point contact provided by the friction reducer reduces dynamic friction during sensor magnet rotation further minimizing angle error and helping prevent "Quiver."

A rotary magnetic encoder assembly constructed in accordance with the present invention is of a noncontact construction having an internal sensor magnet that is read by Hall sensors of a sensor array or arrangement of an internally disposed rotary magnetic encoder chip that rotates substantially in unison with an external drive magnet fixed to a rotary encoder shaft. Such a rotary magnetic encoder advantageously results in the sensor magnet magnetically coupling with the drive magnet rotating substantially in unison therewith in a manner that minimizes sensor magnet friction, angle error and "Quiver."

These and various other features, aspects, and advantages of the present invention will be made apparent from the following descriptions of the drawings.

DRAWING DESCRIPTION

One or more preferred exemplary embodiments of the invention are illustrated in the accompanying drawings in which like reference numerals represent like parts throughout and in which.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 1:
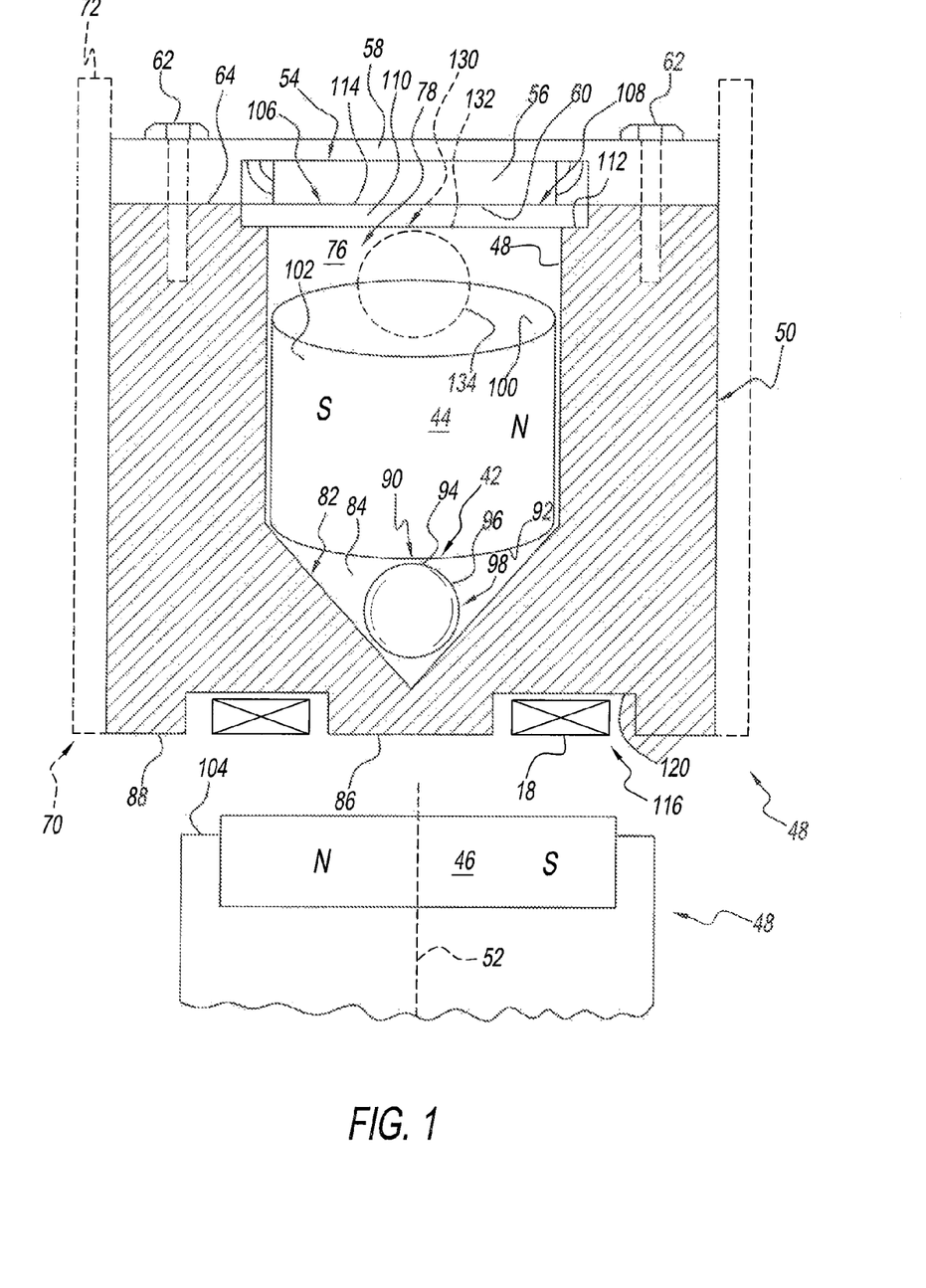
FIG. 1 is a fragmentary cross-sectional view of a portion of an embodiment of a rotary magnetic encoder assembly constructed in accordance with the present invention.
Figure 2:
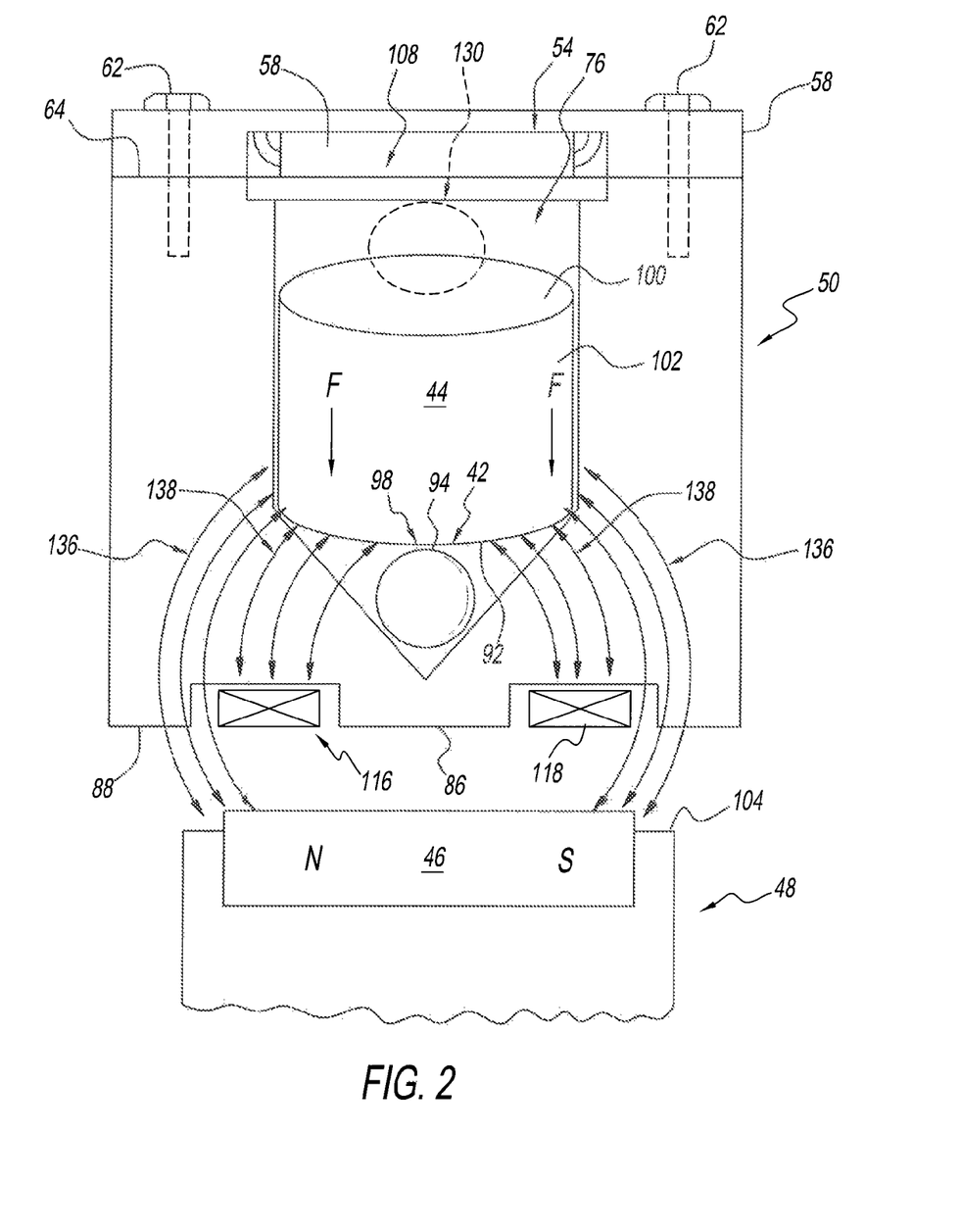
FIG. 2 is a fragmentary cross-sectional view of the rotary magnetic encoder assembly of FIG. 1 depicting magnetic flux lines extending between an externally disposed application drive magnet carried by encoder shaft and a driven exciter or sensor magnet interiorly disposed within a portion of a body of a housing of the rotary magnetic encoder.

FIGS. 1-2 illustrate part of a noncontact or "contactless" rotary magnetic encoder assembly 40 constructed in accordance with the present invention that is simplified for clarity having a friction reducer 42 disposed between a first freewheeling exciter or sensor magnet 44 and a second application or drive magnet 46 attached to a rotary encoder shaft 48 that drives the sensor magnet 42 when the shaft 48 rotates during encoder operation. Such a rotary magnetic encoder 40 is of noncontact or "contactless" construction in that it does not require any shaft bearings (not shown) to precisely locate the encoder shaft 48 as the encoder 40 is advantageously of a shaft misalignment tolerant construction in accordance with that disclosed in commonly owned United States Pat. Appln. Pub. No. 2009/0072816, the entirety of which is expressly incorporated herein. The use of a friction reducer 42 that operably cooperates with the sensor magnet 44 when the magnet 44 is rotated by the drive magnet 46 reduces sensor magnet friction during encoder operation thereby advantageously decreasing and preferably minimizing angle error. The use of a friction reducer 42 advantageously reduces and preferably substantially completely prevents sensor magnet stiction from occurring during spin up of the sensor magnet 44 when the encoder shaft 48 first begins to rotate about axis of rotation 52.

The encoder body or housing 50 is made of a material having relatively low magnetic permeability permitting magnetic flux lines to pass through part of the body or housing 50 enabling magnetic coupling of the sensor magnet 44 and drive magnet 46 during rotation of the encoder shaft 48. In one preferred embodiment, the encoder body or housing 50 is made of a nonmagnetic material having relatively low magnetic permeability that can be a plastic, such as DELRIN, nylon or the like, or a nonmagnetic metallic material, such as aluminum or the like. Such a nonmagnetic material can have a relatively low magnetic permeability of 1.01 or less. The encoder body or housing 50 can be generally cylindrical, such as having a puck shape or annular shape, but can have a different shape if desired.

The encoder 40 includes a magnetic field sensor arrangement 54 that preferably is a magnetic rotary encoder integrated circuit chip 56, such as a commercially available rotary encoder integrated circuit (IC) having an onboard array 60 of Hall sensors used to sense the magnetic field from the sensor magnet 44 when it rotates and that provides an output, e.g., digital signals, indicative of relative and/or absolute rotation, rotary position of magnet 44, and the like as is conventionally known. The encoder chip 56 can be mounted to a circuit board 58 or the like that is attached by fasteners 62 one end 64 of the encoder body or housing 50.

Figure 3:
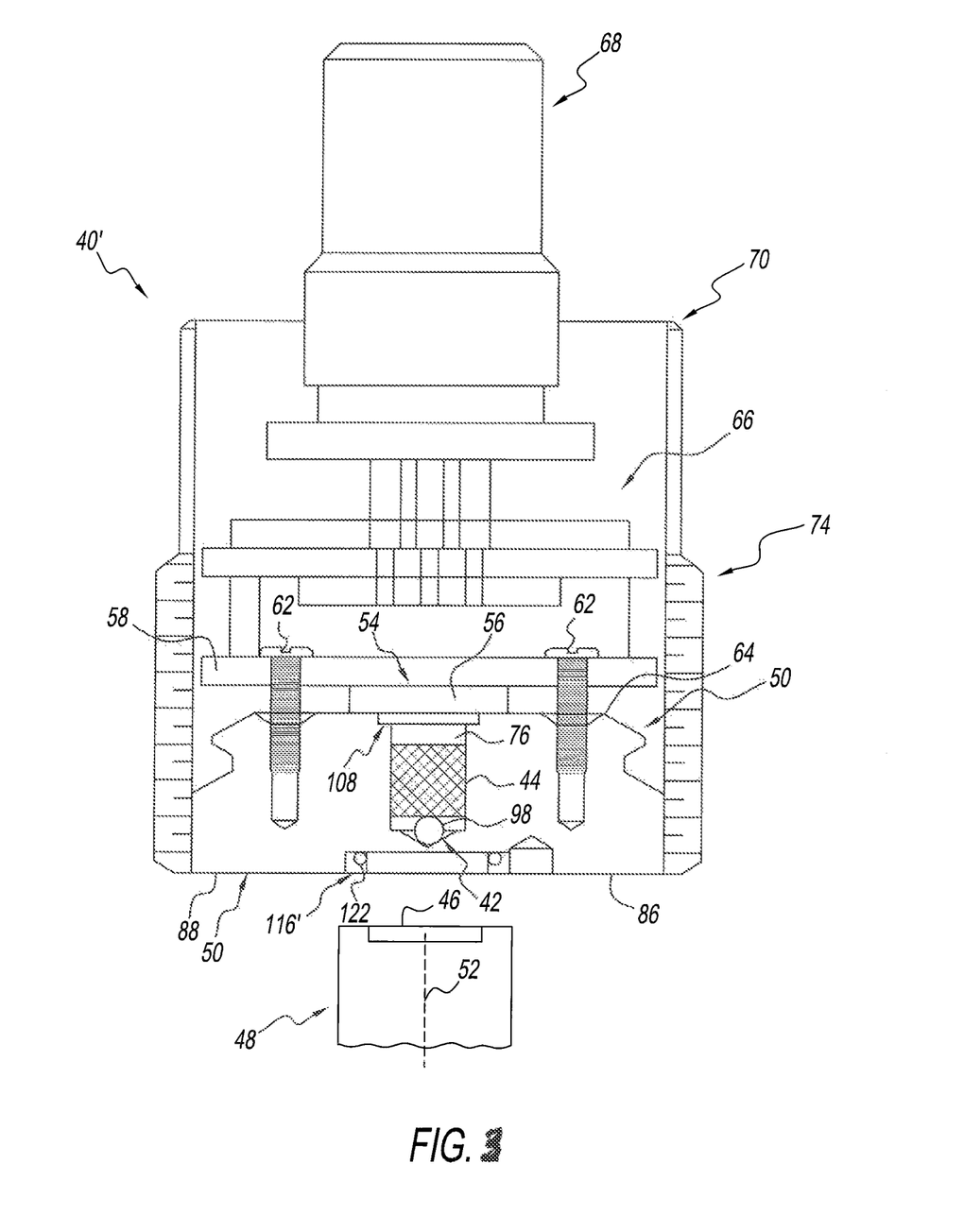
FIG. 3 is a partial fragmentary cross-sectional view of a second preferred embodiment of a rotary magnetic encoder assembly constructed in accordance with the present invention.

With additional reference to FIG. 3, the magnetic rotary encoder chip 56 can be electrically connected to electronics 66 onboard the encoder 40' that can process the output from the chip 56 such as to provide data including data indicative of position, e.g., absolute position within the current 360° of rotation, rotation count and revolutions per minute that can be outputted via an electrical connector 68, e.g., cable connector, to a machine, device or apparatus (not shown) to which the encoder 40' is mounted. The encoder body or housing 50 can be received in an outer housing 70 that can be a tubular shell 72, such as the tubular outer shell 72 shown in FIG. 3 having a threaded region 74 facilitating attachment are mounting to a machine, device or apparatus (not shown) with which the encoder 40' is used. Outer encoder housing 70 can be made of aluminum or another suitable material.

The sensor magnet 44 is disposed adjacent to Hall sensor array 60 of the encoder chip 56 so as to be close enough for the magnetic field of the magnet 44 to be read thereby. The sensor magnet 44 is internally disposed in a pocket 76 within the encoder 40 that positions the magnet 44 in suitably close proximity to the Hall sensor array 60. In the preferred encoder embodiments shown in FIGS. 1-4, the pocket 76 is formed in the encoder body or housing 50 positioning the sensor magnet 44 relative to the Hall sensor array 60 so magnet rotation provides the desired indication of rotation, rotation count and/or revolutions per minute during encoder operation. With reference to FIGS. 1-3, the pocket 76 is formed by a bore 78 in one end 64 of the encoder body or housing 50 with the pocket 76 defined by a sidewall 80 and an end wall 82 having a recess 84 formed therein in which the friction reducer 42 is received. Pocket 76 is configured to accurately locate the sensor magnet 44 relative to the Hall sensor array 60 when the sensor magnet 44 is rotated by the drive magnet 46 when the encoder shaft 40 is rotated during encoder operation to provide a desirably uniform magnetic field to the Hall sensor array 60.

Recess 84 can be a conic section as is depicted in FIG. 1 with the friction reducer 42 disposed between an end wall 86 of the opposite end 88 of the encoder body or housing 50 and the sensor magnet 44. The friction reducer 42 provides a region 90 of reduced surface area contact with a bottom 92 of the sensor magnet 44 that is disposed toward the encoder shaft 48 that minimizes static and dynamic friction of the magnet 44 during startup and rotation. As is shown in FIG. 1, the region 90 of reduced surface area contact with one end 92 of the sensor magnet 44, e.g. magnet bottom 92, can be point contact 94 provided between part of the friction reducer 42 and the magnet 44.

In the preferred embodiment shown in FIGS. 1-4, the friction reducer 42 is a ball 96 that preferably is a single round or spherical bearing 98 that seats in the conic shaped recess 84 formed in the pocket end wall 82 locating the bearing 98 and providing point contact 94 between the bearing 98 and sensor magnet 44. Such a bearing 98 can be and preferably is of nonmagnetic composition, such as made of a material having a relative magnetic permeability of 1.01 or less. Such a bearing 98 can be made of a plastic, such as nylon, a nonmagnetic metal or metallic material, such as a nonmagnetic stainless steel or titanium, e.g., titanium alloy, or another material, such as a ceramic material.

The sensor magnet 44 is generally disc shaped, e.g. cylindrical, has one end 92, e.g. bottom end 92, which is round and substantially flat as is depicted in FIGS. 1-3. The magnet 44 has an opposite end 100, e.g. top end 100, which is also around and substantially flat as is depicted in FIGS. 1-3. The magnet 44 has an endless outer wall 102 that is encompassed or encircled by pocket sidewall 80, which is also of endless construction. The magnet 44 has an outer diameter that is substantially the same as the inner diameter defined by the pocket sidewall 80 with the outer diameter of the magnet 44 being slightly smaller than the inner diameter of the pocket 76 enabling the magnet 44 to rotate relative to the encoder body or housing 50.

The end 106 of the pocket 76 opposite end wall 82 is covered by a cap 108 of nonmagnetic and low friction construction. Such a cap 108 is formed of a flat or generally planar plate 110 that can be circular and that can seat in an annular groove 112 formed in the end wall 64 of the encoder body or housing 50. The cap 108 is disposed between the Hall sensor array 60 and the sensor magnet 44. Where the magnet 44 is separate from the encoder chip 56, the cap 108 is disposed between the chip 56 and magnet 44, such as is shown in FIG. 1. The cap 108 can abut against the chip 56, such as is depicted in FIG. 1, or can be spaced from the chip 56 so as to define a gap between the cap 108 and chip 56. In a preferred embodiment, the cap 108 is made of a bearing material, such as bronze, that is of nonmagnetic and which can be of self lubricating composition. In one preferred embodiment, the cap 108 is a brass Welch plug 114 that can be fixed to the encoder body or housing 50, such as via a press fit or the like.

As is shown in phantom in FIGS. 1-2, the encoder 40 can also include a spacer 130 that can be a ball 132, such as a spherical bearing 134, disposed between the cap 108 and the adjacent end 100 of the sensor magnet 44. Such a spacer 130 can provide point contact between the spacer 130 and the magnet 44 helping to reduce friction as well as limiting travel or levitation of the magnet 44 during rotation towards the cap 108.

The drive magnet 46 is also generally disc shaped, can be cylindrical, and is fixed to a free end 104 of the encoder shaft 48 such that the freewheeling magnet 46 rotates substantially in unison with the shaft 48 during shaft rotation. Both magnets 44 and 46 are relatively powerful permanent magnets with one or both typically being a rare earth magnet, such as an Alnico (AlNiCo) magnet, a samarium cobalt magnet (SmCo5), or a neodymium (NdFeB) magnet. Both magnets are bipolar magnets having one magnet half defining a North Pole (N) and the other magnet half defining a South Pole (S).

Figure 4:
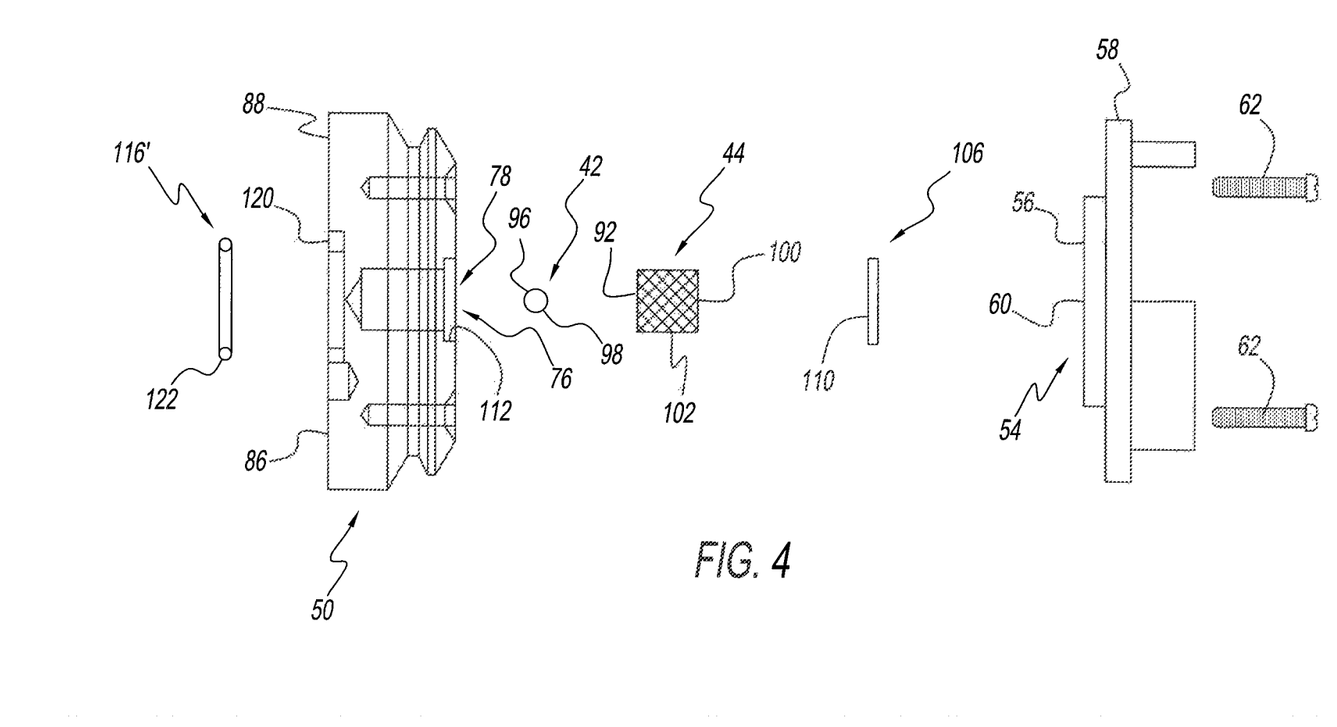
FIG. 4 is an exploded view of a portion of the rotary magnetic encoder assembly shown in FIG. 3.

The encoder 40 includes a magnetic anchor 116 interjacent the free end 104 of the encoder shaft 48 and an adjacent end 88 of the encoder body or housing 50. As is shown in FIGS. 1-3, the magnetic anchor 116 is disposed between the sensor magnet 44 and the drive magnet 46 with the magnetic anchor 116 spaced therebetween. The magnetic anchor 116 is made of a magnetic material having a magnetic permeability less than that of either magnet 44 and 46. The magnetic anchor 116 can be made of a magnetic material that can be ferromagnetic. With reference to FIGS. 1-2, the magnetic anchor 116 is an annular washer 118 received in an annular channel 120 formed in the end wall 86 of the surface 88 of the encoder body or housing 50 facing towards the free end 104 of the encoder shaft 48. The annular washer 118 preferably is retained within the channel 120, such as by being fixed in place to the encoder body or housing 50. With reference to FIG. 4, the magnetic anchor 116' can also be an annular segment of wire 122, such as a circular segment of music wire, which is of magnetic construction.

Such a magnetic anchor 116 or 116' advantageously causes the sensor magnet 44 to be attracted to it helping to pull the magnet 44 toward the friction reducer 42 during encoder shipment and during rotation of the magnet 44 during encoder operation. Doing so, helps minimize angular error by helping to hold the sensor magnet 44 against the friction reducer 42 during rotation of the magnet 44 during encoder operation.

With reference to FIG. 2, during rotation of the encoder shaft 48, magnetic flux lines 136 extend between the drive magnet 46 and the sensor magnet 44 as a result of magnetic coupling that occurs there between. In addition, magnetic flux lines 138 also extend between the sensor magnet 44 and the magnetic anchor 116 as a result of magnetic attraction of the sensor magnet 44 to the magnetic anchor 116. Magnetic coupling between the drive magnet 46 and sensor magnet 44 causes the freewheeling sensor magnet 44 to spin up and reach a rotational speed that is substantially the same as that of the drive magnet 46 and rotating encoder shaft 48 nearly simultaneously therewith minimizing angle error.

As a result of the magnetic coupling between the magnets 44 and 46, sensor magnet 44 is pulled into contact with the friction reducer 42 which minimizes friction there between causing the sensor magnet 44 to reach substantially the same rotational speed as the drive magnet 46 more quickly reducing and minimizing angular error. In addition, as a result of reduced surface area of contact between the sensor magnet 44 and the friction reducer 42, variations in rotational speed between the sensor magnet 44 and the drive magnet 46 are minimized due to reduce dynamic friction thereby reducing and preferably preventing "Quiver" from occurring. The magnetic anchor 116 also helps focus or direct the flux lines 166 more efficiently between the magnets 44 and 46 improving magnetic coupling therebetween reducing angle error. Stiction is also advantageously prevented by the use of the reduced surface area of sensor magnet contact provided by friction reducer 42 which significantly reduces sensor magnet static friction during spin up of the sensor magnet 44 upon the start of rotation of the encoder shaft 48. Preventing stiction from occurring also advantageously helps minimize angle error and prevent "Quiver."

Since shaft rotational speeds, and hence rotational speeds of the magnets 44 and 46 can exceed 1000 revolutions per minute (RPM) and in some cases can exceed speeds greater than about 5000 RPM, the magnetic anchor 116 helps prevent the sensor magnet 44 from levitating or "lifting" away from and out of contact with the friction reducer 42 as a result of the magnetic flux lines 138 producing force, F, of attracting the magnet 44 to the magnetic anchor 116. As a result of the magnetic anchor 116 keeping the sensor magnet 44 in contact with the friction reducer 42 even at such higher encoder shaft rotational speeds, drag acting on the rotating sensor magnet 44 is reduced and preferably substantially completely prevented further helping to minimize angle error and prevent "Quiver."

Figure 5:
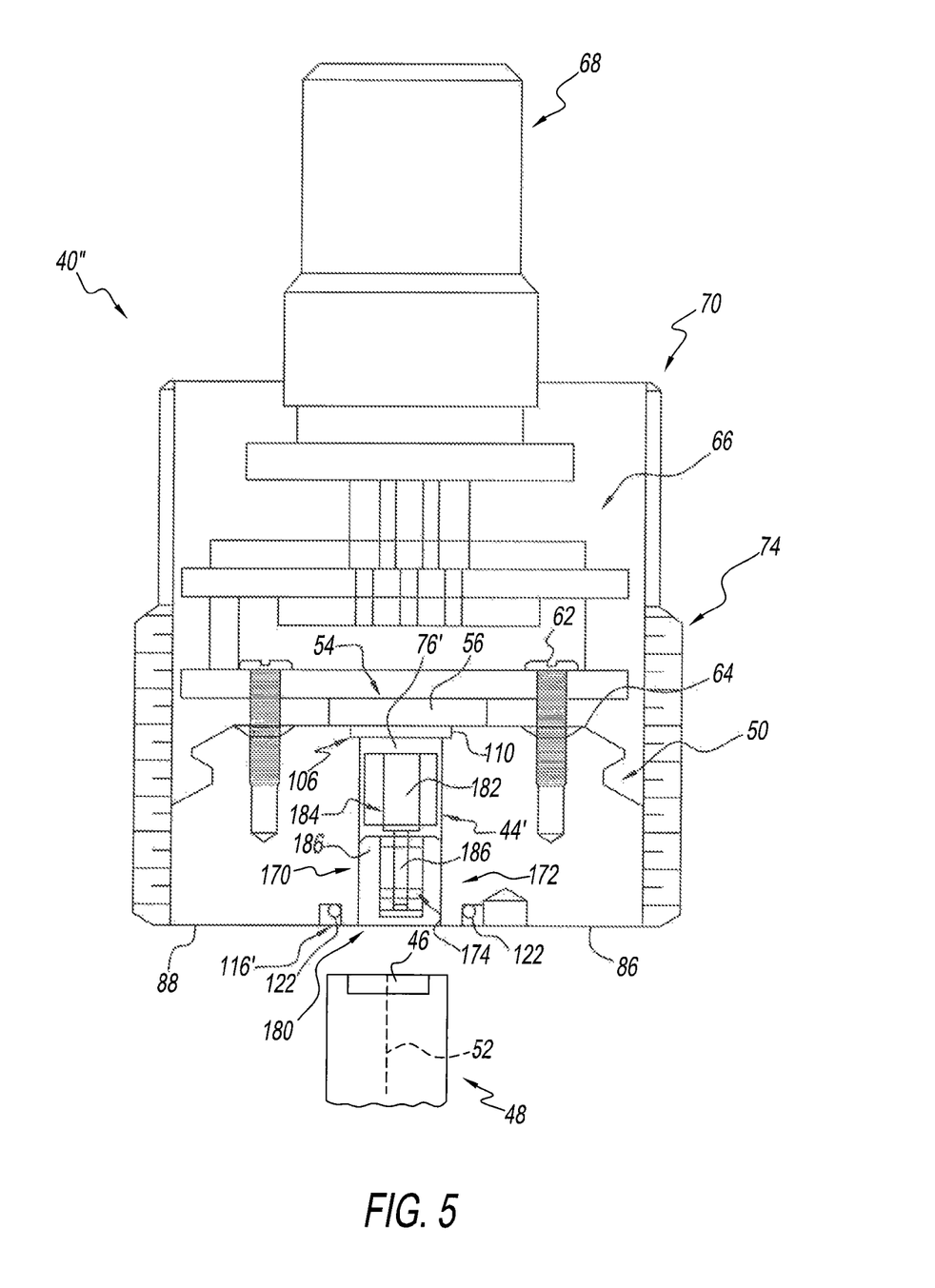
FIG. 5 is a partial fragmentary cross-sectional view of a third preferred embodiment of a rotary magnetic encoder assembly constructed in accordance with the present invention employing a thrust bearing rotatively supporting the sensor magnet.
Figure 6:
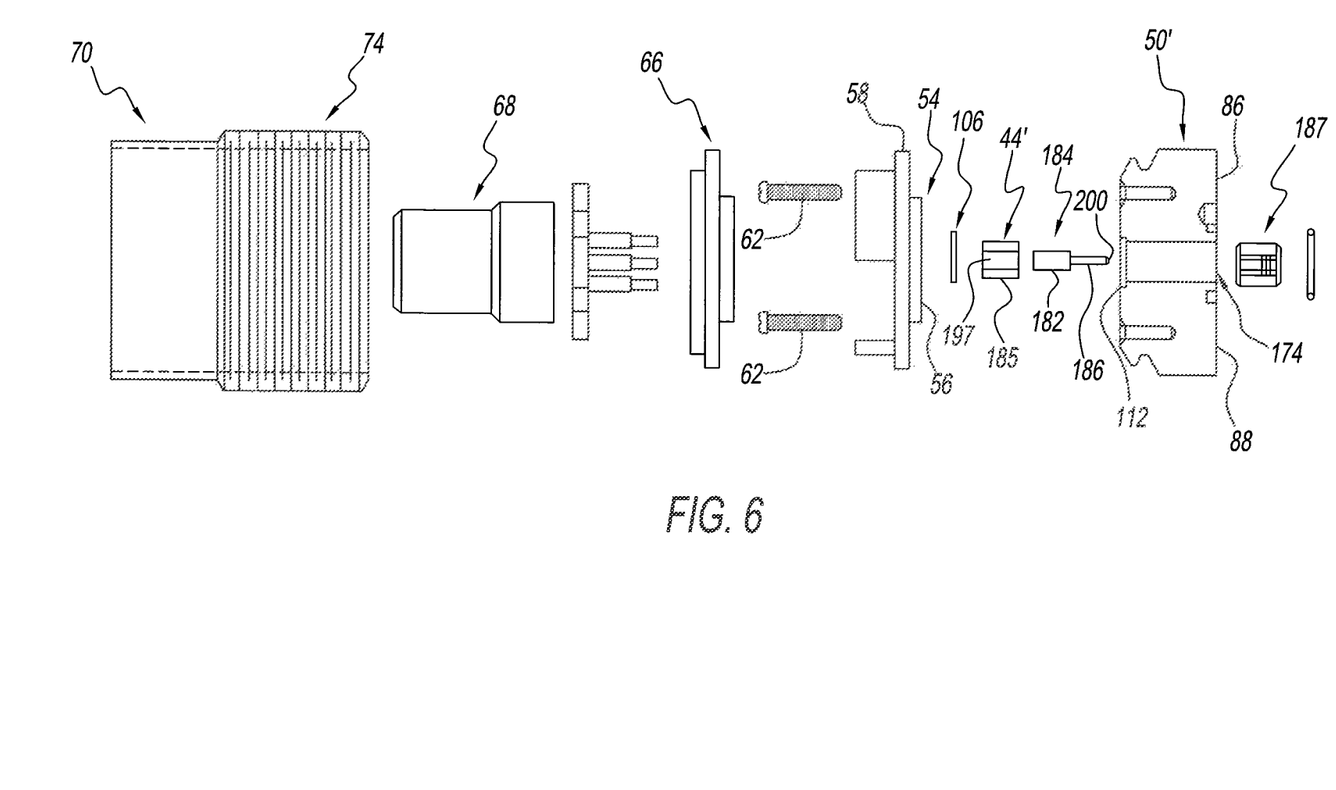
FIG. 6 is an exploded view of the rotary magnetic encoder assembly shown in FIG. 5.
Figure 7:
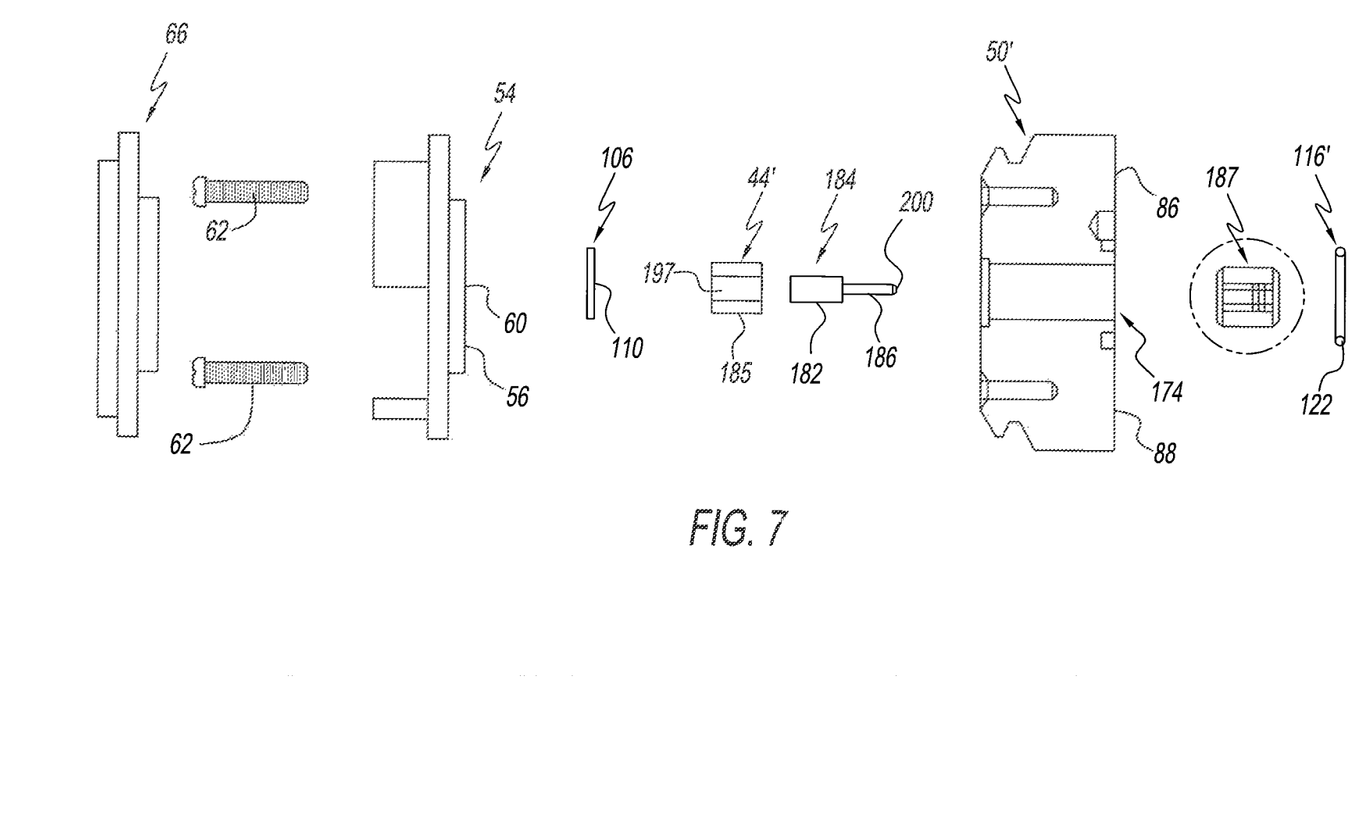
FIG. 7 is an exploded view of part of the rotary magnetic encoder assembly shown in FIG. 5.

FIGS. 5-7 illustrate another preferred embodiment of a rotary magnetic encoder assembly 40" that is the same as that shown in FIGS. 5 and 6 but employs a friction reducer 170 where the sensor magnet 44' is carried by a spindle bearing arrangement 172 that is a thrust bearing disposed in a bore 174 formed in the end wall 88 of the encoder body or housing 50. The bore 174 can be elongate and provides a pocket 178 in which the magnet 44' and spindle bearing arrangement 172 can be preassembled together as a sensor magnet bearing assembly 180 that can be inserted as an assembly 180 into the bore 174 in the end wall 88 of the encoder body or housing 50 as part of encoder assembly. The sensor magnet bearing assembly 180 includes a tubular and generally cylindrical sensor magnet 44' carried by a head 182 of a spindle 184 having an elongate needle 186 that is rotatively received in a bearing basket 187. The sensor magnet 44' is a tube magnet having an annular sidewall 185 that defines a bore 197 in which the spindle head 182 is received. As is best shown in FIG. 5, the bearing basket 187 forms a bore end cap that provides a pocket end wall when the sensor magnet bearing assembly 180 is inserted into bore 174.

Figure 8:
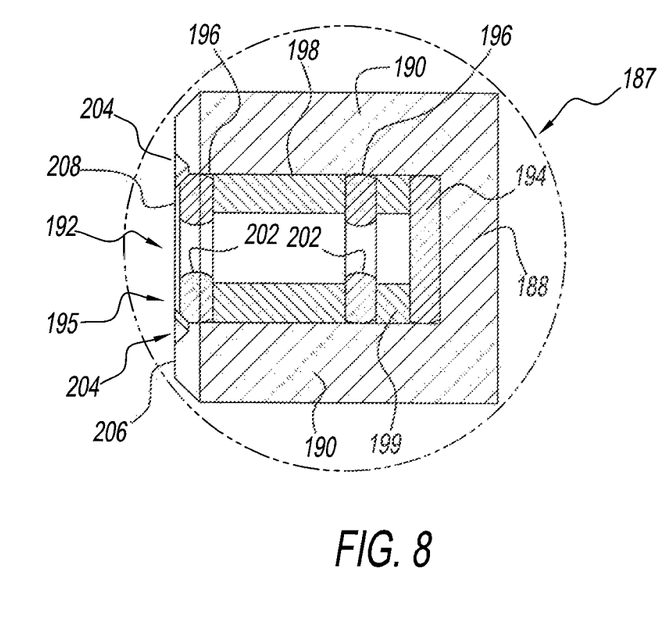
FIG. 8 is an enlarged cross sectional view of a bearing basket assembly of the thrust bearing employed in the rotary magnetic encoder assembly shown in FIG. 5-7.

With reference to FIG. 8, the bearing basket 187 is of generally U-shaped cross-section having an end wall 188 and an annular endless sidewall 190 that defines a spindle needle bearing receptacle 192 in which a spindle supporting bearing assembly 195 is received. The spindle supporting bearing assembly 195 includes a bearing end wall 194 and at least one bearing ring 196 is received. In the bearing basket embodiment shown in FIG. 8, the spindle needle bearing receptacle 192 has a pair of annular bearing rings 196 spaced apart by a tubular spacer 198 disposed in the receptacle 192. The innermost bearing ring 196 can be spaced from the bearing end wall 194 by an annular spacer 199.

In a preferred embodiment, the bearing end wall 194 and axially spaced apart bearing rings 196 are made of a durable, low wear and low friction material such as a jewel, such as a sapphire or ruby jewel of natural or synthetic construction. Such a material also advantageously nonmagnetic and has low magnetic permeability. In one preferred embodiment, the bearing end wall 194 is formed of a sapphire or ruby jewel against which a free end 200 of the spindle needle 186 is rotatively supported via point contact therebetween when inserted into the bearing basket 187. The free end 200 of the spindle needle 186 can be and preferably is conical to produce thrust bearing point contact with the bearing end wall 194. The bearing rings 196 are also formed of sapphire or ruby jewels and have convexly arcuate or curved inner bearing surface walls 202 that can provide line contact with a respective portion of the spindle needle 186 when received in the basket 187 radially supporting the needle 186 at axially spaced apart locations.

The outer bearing ring 196 is held in place by a plurality of stakes 204 formed in an end wall 206 of the basket 187 that also retains the rest of the spindle supporting bearing assembly 195 within the basket 187. The outer bearing ring 196 has an outer bearing surface 208 against which a shoulder 210 (FIG. 7) of the spindle head 182 can rotatively bear during rotation of the sensor magnet 44'. In a preferred embodiment, the shoulder 210 of the spindle head 182 is spaced from the outer surface 208 of the outer bearing ring 196 so as to prevent contact therebetween during rotation of the sensor magnet 44'.

Both the head 182 and needle 186 of the spindle 184 are generally cylindrical and can be elongate as depicted in FIGS. 6 and 7. So that the spindle 184 and sensor magnet 44' rotate substantially in unison during operation, the head 182 of the spindle 184 is received within the tubular magnet 44' and is fixed to the magnet 44'. If desired, the spindle head 182 can be adhesively, e.g. epoxy, or otherwise chemically fixed to the magnet 44'. The spindle 184 is also made of a nonmagnetic material having relatively low magnetic permeability. In one preferred embodiment, the spindle 184 is made of bronze or another nonmagnetic bearing material that can be self-lubricating.

During operation of the encoder 40" shown in FIGS. 5-7, magnetic coupling between magnets 44' and 46 during rotation of the encoder shaft 48 is the same or similar to that depicted in FIG. 2 causes the spindle 184 to rotate in unison with the sensor magnet 44'. The free end 200 of the spindle needle 186 produces point contact between the needle 186 and the jewel bearing end wall 194 within the basket 187 providing axial bearing support. Such a spindle construction provides point contact with the bearing end wall 194 advantageously minimizing static and dynamic friction thereby minimizing angular velocity variations during operation minimizing angle error and substantially completely preventing "Quiver." The bearing rings 196 advantageously encircle the spindle needle 186 providing radial bearing support helping to maintain precise rotation of the magnet 44' about an axis of rotation that extends through the center of the spindle 184. Such a bearing construction advantageously enables high speed operation where encoder shaft speeds exceed 5000 RPM while minimizing and substantially completely preventing angle error and "Quiver."

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

Understandably, the present invention has been described above in terms of one or more preferred embodiments. It is recognized that various alternatives and modifications may be made to these embodiments which are within the scope of the appended claims.

What is claimed is:

1. A rotary magnetic encoder assembly comprising:
an encoder body or housing;
a magnetic field sensor arrangement carried by the encoder body or housing;
an interiorly disposed rotatable first magnet located adjacent the magnetic field sensor arrangement having a first magnetic field sensed by the magnetic field sensor arrangement when the first magnet rotates;
a friction reducer in operable cooperation with the rotatable first magnet;
a rotary encoder shaft carrying a second magnet for rotation substantially in unison therewith disposed adjacent the encoder body or housing having a second magnetic field magnetically coupling the first magnet rotating the first magnet during rotary encoder shaft rotation; and
wherein the friction reducer is disposed between the first magnet and the second magnet.

2. The rotary magnetic encoder assembly of claim 1 further comprising a magnetic anchor disposed interjacent the first magnet and the second magnet.

3. The rotary magnetic encoder assembly of claim 2 wherein the magnetic anchor is comprised of a magnetically attractive material.

4. The rotary magnetic encoder assembly of claim 3 wherein the magnetic anchor is comprised of a ferromagnetic material.

5. The rotary magnetic encoder assembly of claim 4 wherein the magnetic anchor is carried by the encoder body or housing.

6. The rotary magnetic encoder assembly of claim 2 wherein the magnetic anchor holds the first magnet in place during shipping of the rotary magnetic encoder assembly.

7. The rotary magnetic encoder assembly of claim 2 wherein the magnetic anchor focuses magnetic flux of the second magnet toward the first magnet increasing magnetic coupling therebetween.

8. The rotary magnetic encoder assembly of claim 1 wherein the magnetic anchor is annular and formed substantially completely of one of a magnetically attractive material and a ferromagnetic material.

9. The rotary magnetic encoder assembly of claim 1 wherein the friction reducer is configured to provide a region of reduced surface area contact with the first magnet.

10. The rotary magnetic encoder assembly of claim 1 wherein the friction reducer is configured to provide point contact with the first magnet.

11. The rotary magnetic encoder assembly of claim 10 wherein the friction reducer comprises a ball.

12. The rotary magnetic encoder assembly of claim 11 wherein the ball comprises a spherical bearing.

13. The rotary magnetic encoder assembly of claim 11 wherein the ball is comprised of non-magnetic material.

14. The rotary magnetic encoder assembly of claim 11 wherein the encoder body or housing comprises a bore formed therein and wherein the ball and first magnet is received in the bore in the encoder body or housing.

15. The rotary magnetic encoder assembly of claim 14 wherein the encoder body or housing comprises a pocket formed therein defined by a pocket sidewall and endwall, and wherein the ball and first magnet are received in the pocket in the encoder body or housing with the ball disposed between the pocket endwall and the first magnet.

16. The rotary magnetic encoder assembly of claim 1 wherein the friction reducer comprises a thrust bearing.

17. The rotary magnetic encoder assembly of claim 16 wherein the thrust bearing comprises a spindle carrying the first magnet.

18. The rotary magnetic encoder assembly of claim 1 wherein the first magnet is received in a pocket disposed in the encoder body or housing, and wherein the friction reducer comprises a bearing basket in which a needle disposed in the pocket is received and rotatively supported thereby.

19. The rotary magnetic encoder assembly of claim 1 wherein the friction reducer comprises a spindle carrying the first magnet that has a needle having a free end in point bearing contact with a generally planar bearing.

20. The rotary magnetic encoder assembly of claim 1 wherein the friction reducer comprises a spindle fixed to the first magnet for rotation in unison therewith that has a needle that is radially and axially supported during rotation.

21. A rotary magnetic encoder assembly comprising:
an encoder body or housing;
a magnetic field sensor arrangement carried by the encoder body or housing;
a first magnet disposed within the encoder body or housing, the first magnet located close enough to the magnetic field sensor arrangement for a magnetic field of the first magnet to be sensed by the magnetic field sensor;
a rotary encoder shaft having a second magnet fixed thereto for rotation substantially in unison therewith that magnetically couples with the first magnet rotating the first magnet when the encoder shaft rotates; and
a friction reducer comprising a spindle bearing arrangement in operable cooperation with the first magnet.

22. The rotary magnetic encoder assembly of claim 21 wherein the spindle bearing arrangement comprises an elongate bearing needle narrower than the first magnet that is received in a receptacle in a bearing basket configured to rotatively support at least a portion of the bearing needle received therein.

23. The rotary magnetic encoder assembly of claim 21 wherein the spindle bearing arrangement and first magnet are received in a pocket formed in the encoder body or housing.

24. A rotary magnetic encoder assembly comprising:
an encoder body or housing;
a magnetic field sensor arrangement carried by the encoder body or housing;
a rotatable first magnet located adjacent the magnetic field sensor arrangement;
a friction reducer in operable cooperation with the rotatable first magnet comprising a spindle bearing arrangement having an outwardly extending bearing needle generally coaxial with an axis of rotation of the first magnet; and
a rotary encoder shaft having a second magnet fixed thereto for rotation substantially in unison therewith that magnetically couples with the first magnet rotating the first magnet when the encoder shaft rotates.

25. The rotary magnetic encoder assembly of claim 24 wherein the first magnet comprises a spindle of the spindle bearing arrangement, wherein the bearing needle extends generally axially outwardly from the spindle, and wherein the bearing needle is radially and axially supported during rotation of the first magnet.

26. The rotary magnetic encoder assembly of claim 25 wherein the first magnet is generally cylindrical and the spindle further comprises a spindle head received in the generally cylindrical first magnet.

27. A rotary magnetic encoder assembly comprising:
an encoder body or housing;
a magnetic field sensor arrangement carried by the encoder body or housing;
a rotatable first magnet located adjacent the magnetic field sensor arrangement;
a friction reducer in contact with the rotatable first magnet;
a rotary encoder shaft having a second magnet fixed thereto for rotation substantially in unison therewith that magnetically couples with the first magnet rotating the first magnet when the encoder shaft rotates; and
a magnetic anchor disposed between the first magnet and the second magnet pulling the first magnet into contact with the friction reducer.

28. The rotary magnetic encoder assembly of claim 27 wherein the magnetic anchor is formed substantially completely of a ferromagnetic material.

29. The rotary magnetic encoder assembly of claim 28 wherein the magnetic anchor is an annulus or ring formed substantially continuously of the ferromagnetic material.

30. The rotary magnetic encoder assembly of claim 27 wherein the magnetic anchor is formed substantially completely of a magnetically attractive material.

31. The rotary magnetic encoder assembly of claim 30 wherein the magnetic anchor is an annulus or ring formed substantially continuously of the magnetically attractive material.

32. The rotary magnetic encoder assembly of claim 30 wherein the magnetic anchor holds the first magnet in place during shipping of the rotary magnetic encoder assembly.

33. The rotary magnetic encoder assembly of claim 27 wherein the magnetic anchor is carried by the encoder body or housing.

34. The rotary magnetic encoder assembly of claim 33 wherein the magnetic anchor focuses magnetic flux of the second magnet toward the first magnet increasing magnetic coupling therebetween.

35. The rotary magnetic encoder assembly of claim 27 wherein the friction reducer comprises a spindle bearing arrangement.

36. The rotary magnetic encoder assembly of claim 24 further comprising a magnetic anchor made substantially completely of one of a magnetically attractive material and a ferromagnetic material disposed between the spindle bearing arrangement and the second magnet.

37. The rotary magnetic encoder assembly of claim 21 further comprising a magnetic anchor comprised of one of a magnetically attractive material and a magnetically attractive ferromagnetic material, the magnetic anchor disposed (a) between the first magnet and the second magnet, and (b) outwardly of the spindle bearing arrangement.

* * * * *